Nov. 26, 1940.　　J. W. OVERBEKE　　2,222,683
AIRCRAFT CONSTRUCTION
Filed Dec. 15, 1939　　5 Sheets-Sheet 1

Inventor
JOHN WILLIAM OVERBEKE,
By
Attorney

Nov. 26, 1940.  J. W. OVERBEKE  2,222,683
AIRCRAFT CONSTRUCTION
Filed Dec. 15, 1939  5 Sheets-Sheet 2

Inventor
JOHN WILLIAM OVERBEKE,

By
Attorney

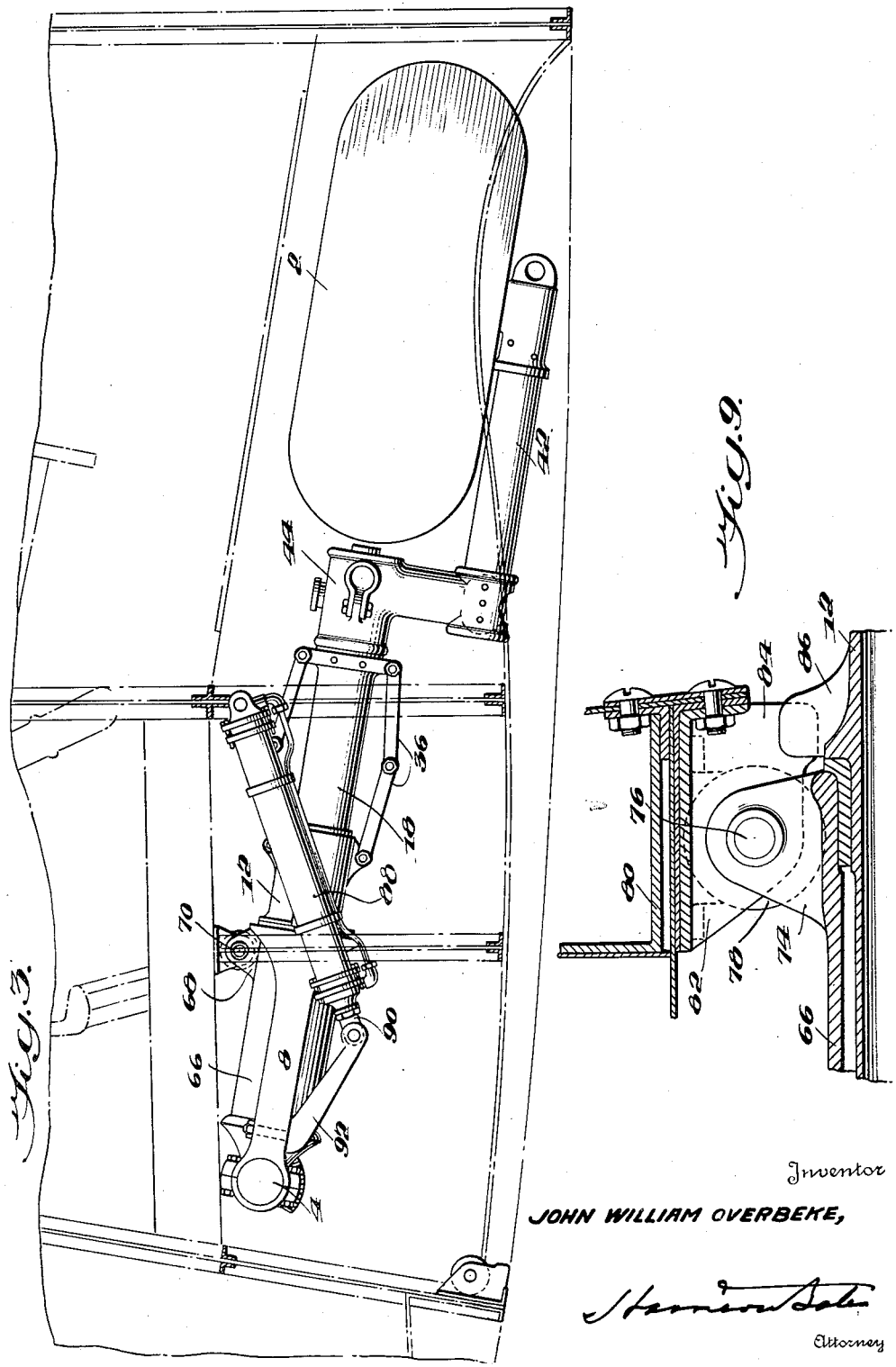

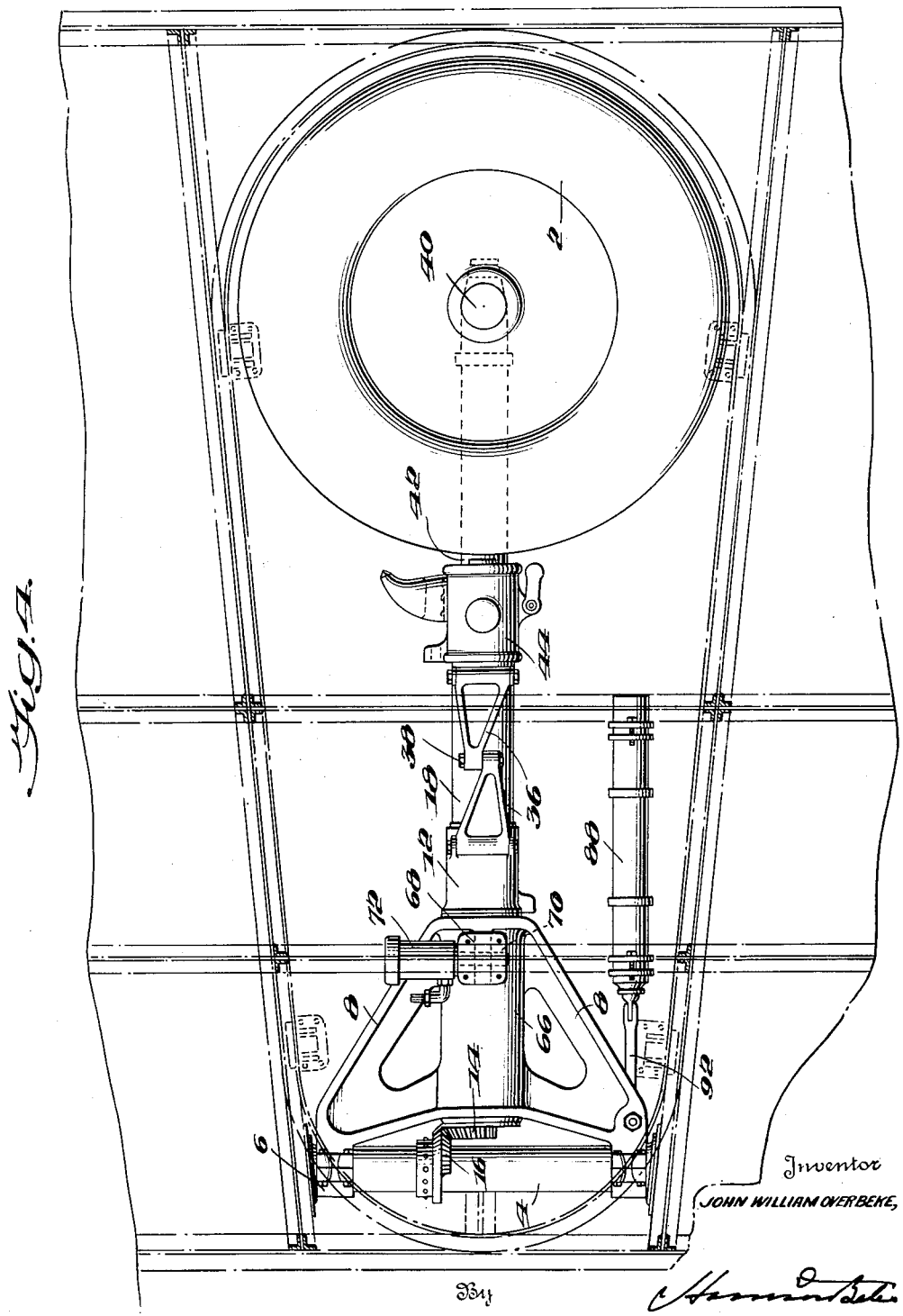

Nov. 26, 1940.  J. W. OVERBEKE  2,222,683
AIRCRAFT CONSTRUCTION
Filed Dec. 15, 1939   5 Sheets—Sheet 5
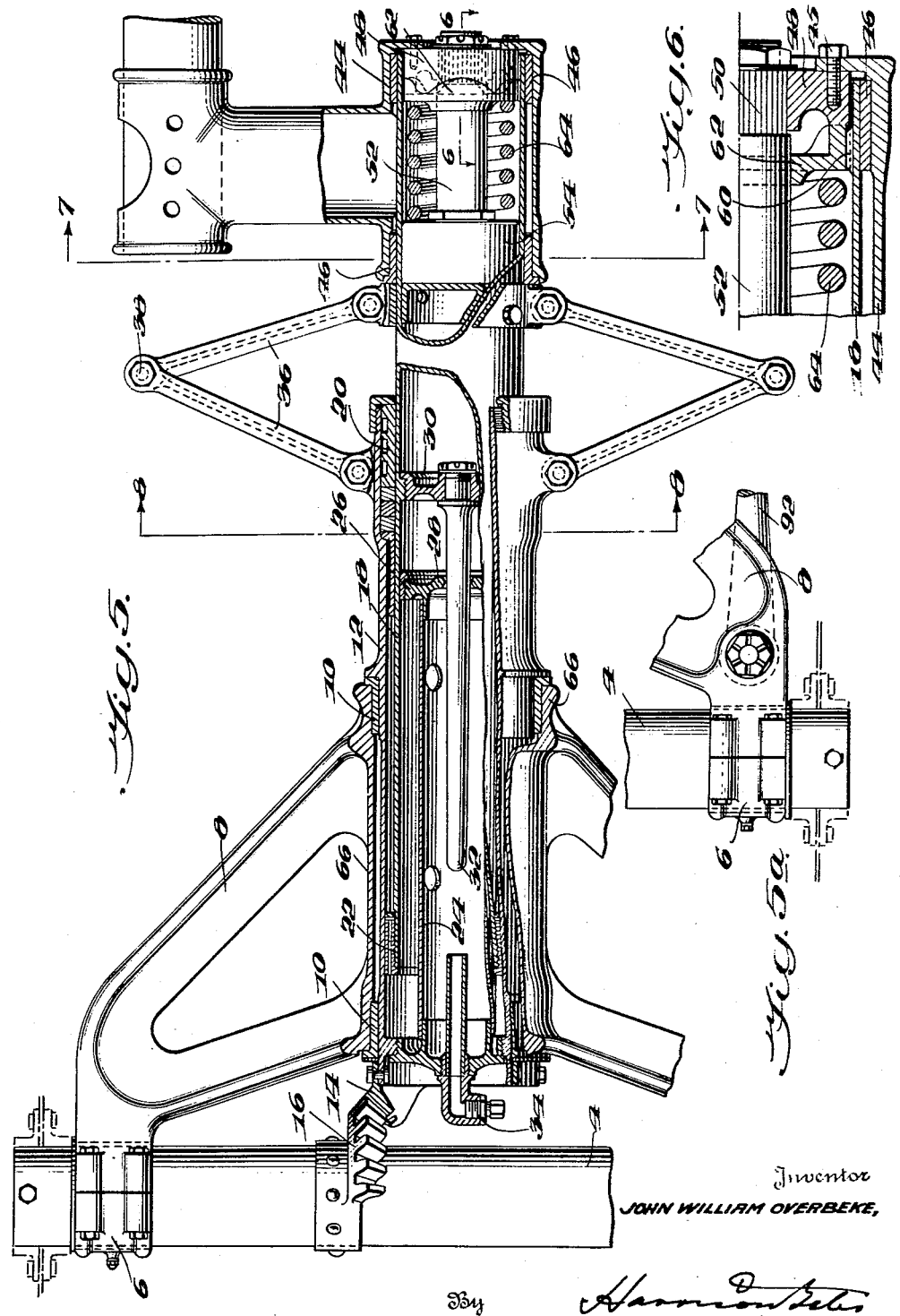
Inventor
JOHN WILLIAM OVERBEKE,
By Harmon Betts
Attorney Patented Nov. 26, 1940

2,222,683

UNITED STATES PATENT OFFICE 2,222,683

AIRCRAFT CONSTRUCTION

John W. Overbeke, Anneslie, Md., assignor to The Glenn L. Martin Company, Baltimore, Md.

Application December 15, 1939, Serial No. 309,358

7 Claims. (Cl. 244—102)

The invention relates to wheel mountings, and particularly to mechanism for the mounting of front wheels of aircraft.

The primary object of the invention is to provide a simple and effective mounting for aircraft wheels.

The front wheels of aircraft when the craft is moving on the ground are subjected to vibrations which are likely to disturb the proper movement of the ship, and which also subject the mechanism to large strains. The primary object of the present invention is to provide a wheel mounting which damps the vibrations, without utilizing a rigid mounting between the wheel and the aircraft.

A further object of the invention is to provide a novel type of mechanism for damping vibrations of an aircraft wheel.

Still another object of the invention is to provide a retractible landing wheel with locking means adequate to prevent turning of the wheel when it is in its down position, but which permit turning of the wheel as it moves to its retracted position so that it can lie flat within the body of the aircraft.

Further objects and advantages of the invention will appear more fully from the following description, particularly when taken in conjunction with the accompanying drawings which form a part thereof.

In the drawings:

Fig. 3 is a side view of the wheel and its mounting in retracted position;

Fig. 4 is a top plan view of the same;

Fig. 5 is a detail view of the wheel mounting with parts in section;

Fig. 5a is a continuation of the lower left-hand portion of Fig. 5;

Fig. 6 is a detail section taken substantially along the line 6—6 of Fig. 5;

Figure 7:
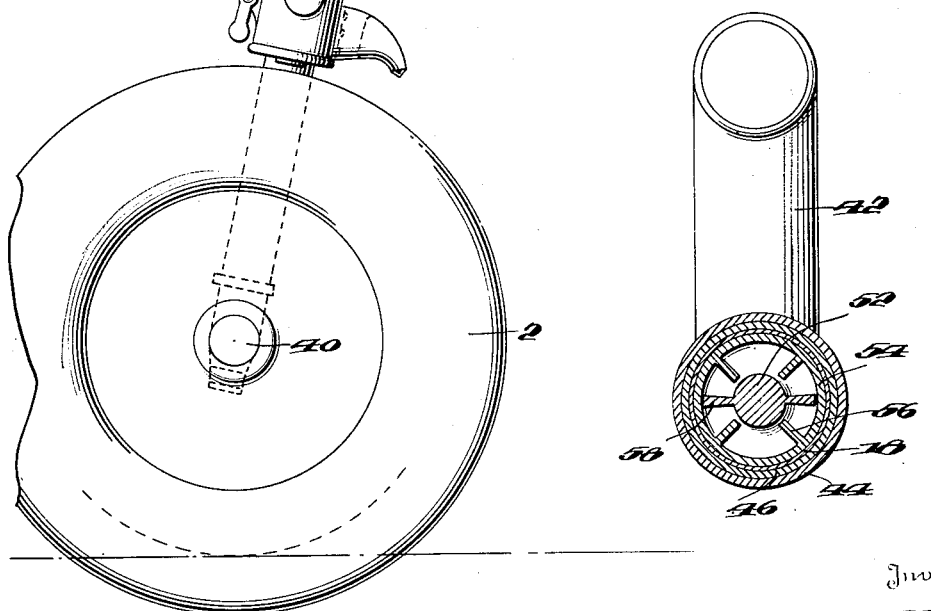

Figs. 7 and 8 are cross sections on the lines 7—7 and 8—8 respectively of Fig. 5;

Fig. 9 is a detail view of the mechanism for locking the wheel mounting when it is in the down position.

Figure 1:
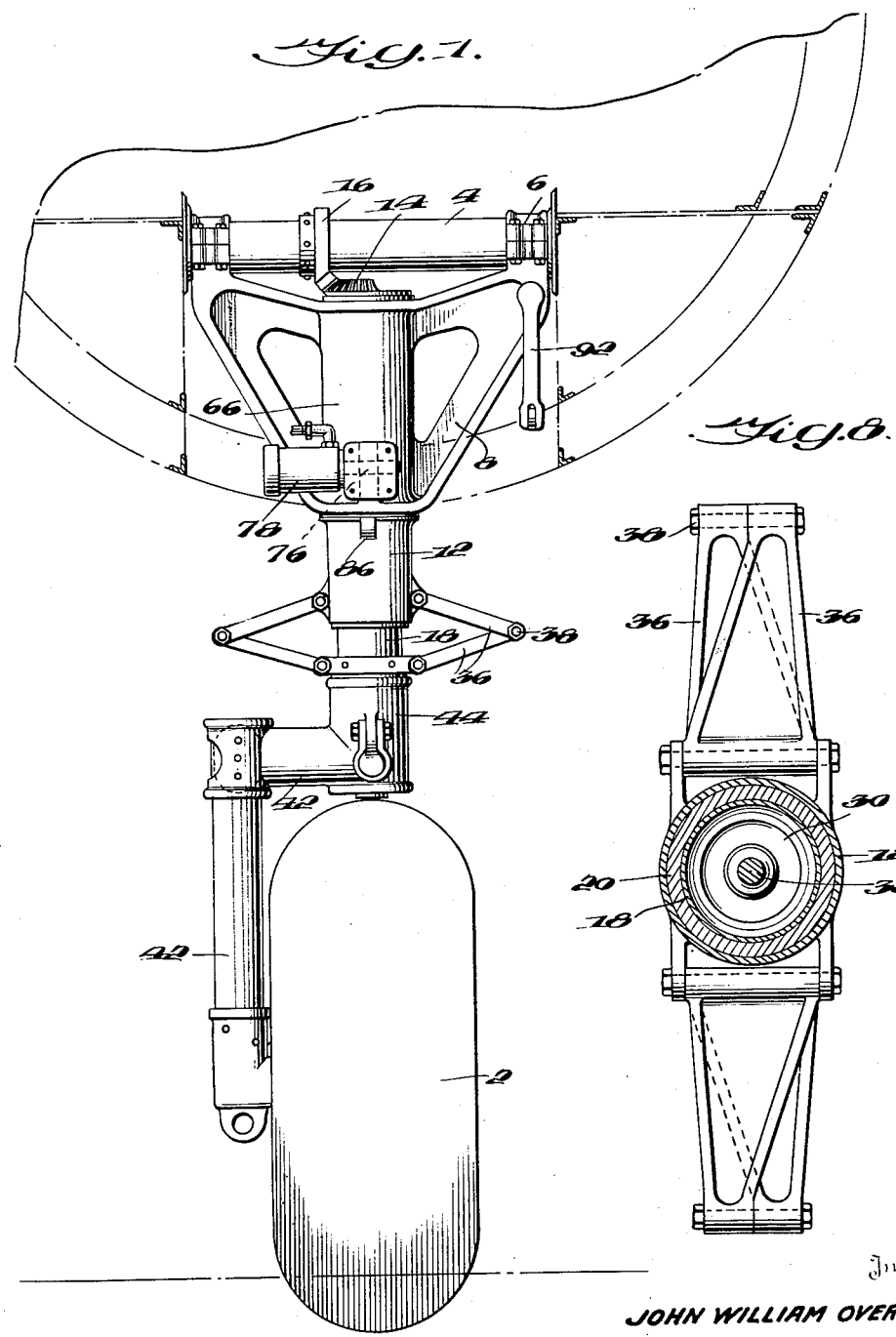
Fig. 1 is a front elevation of the wheel mounting in lowered position.
Figure 2:
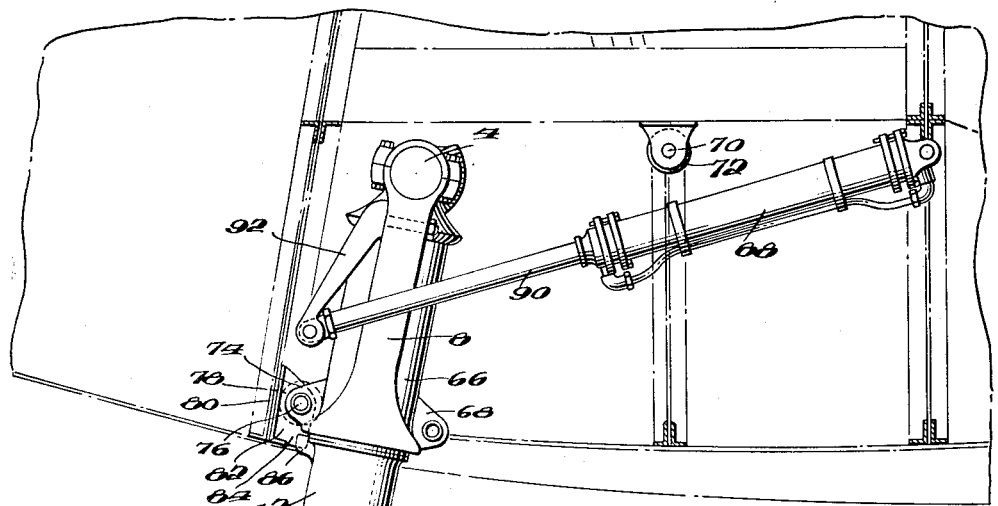
Fig. 2 is a side view of the same.

The invention applies to the mounting of a front wheel of an aircraft, such as a wheel 2. This wheel is to be retracted into and projected from the aircraft. In the operative or projected position (Figs. 1 and 2) the central plane of the wheel is normally substantially parallel to the longitudinal central plane of the aircraft, the front view in Fig. 1 showing this position. However, when the wheel is retracted into the aircraft, its longitudinal central plane should be generally horizontal as shown for example in Figs. 3 and 4. Since the axis about which the wheel mounting mechanism swings is transverse to the longitudinal axis of the aircraft, this requires a mechanism for turning the wheel as it swings upwardly to its retracted position.

The invention also provides means which permit the wheel to undergo a slight turning movement, but which damp this turning movement.

The wheel mechanism is mounted in the aircraft upon a shaft 4 extending transversely of the aircraft. Mounted on this shaft by bearings 6 are arms 8. These arms converge towards one another and support bearings 10. A cylinder 12 is turnably mounted in the bearings 10 and is thus supported by arms 8.

Cylinder 12 carries at its inner end a segmental gear 14, which merges with a segmental gear 16 fixed on the shaft 4. It is evident that as the arms 8 swing and carry the cylinder 12 around the shaft 4, the engagement of gears 14 and 16 will cause the cylinder to turn about its own longitudinal axis in the bearings 10. This produces the turning of the wheel from the position of Fig. 1 to the position of Fig. 3 as the wheel is retracted, and vice versa.

Slidable in the cylinder 12 is a hollow sleeve 18. This sleeve extends through the outer end of the cylinder, the connection being sealed by sealing means 20. At the inner end, the sleeve 18 is guided in cylinder 12 by a suitable bearing member 22.

Extending from the inner end of the cylinder 12 is a sleeve 24 which carries at its outer end a piston 26. Piston 26 fits in sleeve 18 and slides internally therein. Piston 26 has a limited central opening formed by inward projections 28 into the interior of sleeve 24.

Secured inside and intermediate the length of sleeve 18 is a piston portion 30, which has an inwardly extending pin 32 which passes through the opening in piston 26 with a slight space therebetween.

This mechanism constitutes a shock absorber. It is partially filled with a suitable fluid, as for example through plug 34. When the sleeve 18 moves into the cylinder 12, because of the engagement of the wheel carried by the mechanism with the ground and the weight of the aircraft resting thereon, fluid is driven by the piston portion 30 through the small space between pin 32 and projections 28. The air trapped within the space to the left or upper side of piston 26 is thus compressed. The compression must take place gradually, however, because of the slow movement of the fluid through the small space between pin 32 and projections 28. Thus the movement of the mechanism is damped, and a shock absorbing device is formed.

The sleeve 18 is prevented from turning in the cylinder 12 by suitable links such as 36 pivoted to the cylinder 12 and sleeve 18 respectively, and pivoted to each other as at 38.

The wheel 2 is carried by a spindle 40 mounted on a bent portion 42. Portion 42 has a cylindrical section 44 which is turnably mounted on the end of sleeve 18 by bearings 46. Rigidly connected to the cylindrical portion 44 by bolts 45 is a block 48 which closes the end of sleeve 18. This block has keyed to it as at 50 a cylindrical body or shaft 52 which extends inwardly into the sleeve 18. Shaft 52 extends into a damping device having a casing 54 (Fig. 7). This casing is filled with a suitable fluid. Within the casing are radially inwardly extending vanes 56 slightly spaced from the shaft 52, and the shaft 52 carries vanes 58. It is evident that any turning movement of shaft 52 with respect to casing 54 will be damped by the necessity of the fluid's passing through the small spaces between vanes 56 and shaft 52.

Slidably keyed within the free end of sleeve 18, as by a key 60, is a cam member 62. The shaft 52 extends through this cam member and is turnable therein. A coil spring 64 surrounds the shaft 52 and rests at one end against casing 54 and at the other against cam member 62. Member 48 and member 62 are provided with opposed cam surfaces, substantially in the form of sine curves, as is shown in Figs. 5 and 6.

The operation of this part of the mechanism is as follows: Assuming that the wheel begins to vibrate, or, in other words, to exert forces which would tend to turn sleeve 44 on sleeve 18, such forces may cause a slight turning movement of the sleeve 44 because the turning of member 48 through the cam surfaces will push member 62 inward or to the left against the spring 64. As soon as the disturbing vibration ceases, however, spring 64 will cause the cam surfaces to occupy their normal position as shown in the drawings, and will thus return the wheel to its proper aligned position. At the same time, any tendency of sleeve 44 to turn under vibrations is damped by the damper mechanism 54 shown in Fig. 7.

The arms 8 carry devices to permit the wheel mounting to be locked either in retracted or extended position. The retracted position is shown in Figs. 3 and 4. The cylindrical portion 66 which is rigid with arms 8 and which carries bearings 10 is provided with a lug 68 (Fig. 3). Through this lug may be projected a pin 70 which is controlled by a hydraulic cylinder 72. Thus when the mechanism is in the position shown in Figs. 3 and 4, pin 70 will lock it securely against release.

When the mechanism is moved downwardly, on the other hand, cylinder 66 also carries a lug 74 (Fig. 9) adapted to be engaged by a pin 76 operated by a hydraulic cylinder 78 mounted on the frame 80 of the aircraft. The pin 76 also passes through a lug 82 carried by frame 80. This lug has downward extensions 84, between which when the mechanism is in the extended position there is engaged a lug 86 rigid with cylinder 12. Thus when the parts are down the cylinder 12 is positively locked against movement.

The wheel is retracted and projected by suitable mechanism, such as a hydraulic device composed of a cylinder 88 pivoted to the aircraft frame and a piston 90 pivoted to an arm 92 rigid with arms 8.

While I have described herein one embodiment of my invention I wish it to be understood that I do not intend to limit myself thereby except within the scope of the appended claims.

I claim:

1. An aircraft wheel suspension comprising a shaft mounted on an aircraft and extending transversely thereof, a member mounted on said shaft to turn about the axis thereof, a second member rotatably mounted on the outer end of said first member, a wheel mounted on said second member to rotate thereon about a horizontal axis, a cam member rigidly connected to said second member, a second cam member cooperating with said first cam member and slidably keyed with said first member, and a spring normally pressing said cam members into engagement, a shaft rigid with said first cam member and extending through said second cam member, a casing connected with said first member, said shaft extending into said casing, and cooperating means connected to said casing and said shaft for damping turning movements of said shaft with respect to said casing.

2. An aircraft wheel suspension comprising a shaft mounted on an aircraft and extending transversely thereof, a cylindrical member mounted on said shaft to turn about the axis thereof, the axis of said member being substantially perpendicular to the axis of said shaft, a second member rotatably mounted on the outer end of said first member, a wheel mounted on said second member to rotate thereon about a horizontal axis perpendicular to the axis of said first member, a cam member rigidly connected to said last member and extending into the end of said first member, a second cam member cooperating with said first cam member and slidably keyed within said first member, a spring normally pressing said cam members into engagement, a shaft rigid with said first cam member and extending through said second cam member, a casing within said first member, said shaft extending into said casing, and cooperating means connected to said casing and said shaft for damping turning movements of said shaft with respect to said casing.

3. An aircraft wheel suspension comprising a shaft mounted on an aircraft and extending transversely thereof, a cylinder mounted on said shaft to turn about the axis thereof, the axis of said cylinder being substantially perpendicular to the axis of said shaft, a sleeve slidable in said cylinder, said cylinder including shock absorber means to damp the sliding movement of the sleeve therein, means connected to said sleeve and to said cylinder to prevent rotation of said sleeve with respect to said cylinder while permitting sliding movement therebetween, a member rotatably mounted on the outer end of said sleeve, a wheel mounted on said member to rotate thereon about a horizontal axis perpendicular to the axis of said sleeve, a cam member rigidly connected to said last member and extending into the end of said sleeve, a second cam member cooperating with said first cam member and slidably keyed within said sleeve, and a spring normally pressing said cam members into engagement.

4. An aircraft wheel suspension comprising a shaft mounted on an aircraft and extending transversely thereof, a cylinder mounted on said shaft to turn about the axis thereof, the axis of said cylinder being substantially perpendicular to the axis of said shaft, a sleeve slidable in said cylinder, said cylinder including shock absorber means to damp the sliding movement of the sleeve therein, means connected to said sleeve and to said cylinder to prevent rotation of said sleeve with respect to said cylinder while permitting sliding movement therebetween, a member rotatably mounted on the outer end of said sleeve, a wheel mounted on said member to rotate thereon about a horizontal axis perpendicular to the axis of said sleeve, a cam member rigidly connected to said last member and extending into the end of said sleeve, a second cam member cooperating with said first cam member and slidably keyed within said sleeve, a spring normally pressing said cam members into engagement, a shaft rigid with said first cam member and extending through said second member, a casing within said sleeve, said shaft extending into said casing, and cooperating means connected to said casing and said shaft for damping turning movements of said shaft with respect to said casing.

5. In an aircraft wheel mounting, a member mounted on the aircraft, means mounted on said member to turn about an axis located in a substantially vertical plane, a wheel mounted on said last named means, centering means for normally holding said wheel in a predetermined position with respect to said members, said centering means comprising engaging cams connected to said first means and member respectively, spring means holding said cams in engagement, a shaft rigid with one of said cams, a casing operatively connected with the other cam, said shaft extending into said casing, and cooperating means connected to said casing and said shaft for damping turning movements of said shaft with respect to said casing.

6. An aircraft wheel suspension comprising a member mounted on said aircraft, a second member rotatably mounted on said first member, a wheel mounted on said second member, a cam member rigidly connected to said second member, a second cam member cooperating with said first cam member and slidably keyed with said first member, and a spring normally pressing said cam members into engagement, a shaft rigid with one of said cam members, a casing connected with the other cam member, said shaft extending into said casing, and cooperating means connected to said casing and said shaft for damping turning movements of said shaft with respect to said casing.

7. An aircraft wheel suspension comprising a member mounted on said aircraft, a second member rotatably mounted on said first member, a wheel mounted on said second member, a cam member rigidly connected to said second member, a second cam member cooperating with said first cam member and slidably keyed with said first member, and a spring normally pressing said cam members into engagement, a shaft rigid with said first cam member and extending through said second cam member, a casing connected with said first member, said shaft extending into said casing, and cooperating means connected to said casing and said shaft for damping turning movements of said shaft with respect to said casing.

JOHN W. OVERBEKE.